United States Patent [19]

Baker, deceased et al.

[11] Patent Number: 5,154,567
[45] Date of Patent: Oct. 13, 1992

[54] LOW FREQUENCY VIBRATION ASSEMBLY

[75] Inventors: Richard L. Baker, deceased, late of San Clemente, by Betty A. Baker, executrix; Robert H. Weinmann, Jr., Laguna Hills, both of Calif.; Karl S. Weibezahn, Corvallis, Oreg.

[73] Assignee: Hughes Aircraft Company, Los Angeles, Calif.

[21] Appl. No.: 666,938

[22] Filed: Mar. 11, 1991

[51] Int. Cl.⁵ .................. G01M 7/08; B06B 1/12; B06B 1/18
[52] U.S. Cl. .............................. 73/665; 73/12
[58] Field of Search .............. 318/114; 73/11, 12, 73/662, 665, 666; 248/559; 310/81

[56] References Cited

U.S. PATENT DOCUMENTS

| | | | |
|---|---|---|---|
| 2,773,482 | 12/1956 | Dickie | 73/665 |
| 2,810,288 | 10/1957 | Herron et al. | 73/12 |
| 3,064,464 | 11/1962 | Black et al. | 73/12 |
| 4,181,025 | 1/1980 | Abstein, Jr. et al. | 73/665 |
| 4,181,026 | 1/1980 | Abstein, Jr. et al. | 73/665 |
| 4,181,027 | 1/1980 | Talbott, Jr. | 73/665 |
| 4,181,028 | 1/1980 | Talbott, Jr. | 73/665 |
| 4,181,029 | 1/1980 | Talbott, Jr. | 73/665 |
| 4,735,089 | 1/1980 | Baker et al. | 73/663 |

Primary Examiner—Hezron E. Williams
Assistant Examiner—Rose M. Finley
Attorney, Agent, or Firm—William J. Streeter; Georgann S. Grunebach; W. K. Denson-Low

[57] ABSTRACT

A vibration assembly comprising a housing (12) having a central cavity (20) and a pair of side cavities (22, 24) of radially smaller dimension than that of the central cavity, all of which extends axially about an axis (26) from opposed ends of the central cavity. A piston (50) is housed within the cavities (20, 22, 24) and includes a mass (52) disposed within the central cavity (20) and a pair of supports (54, 56) which are disposed within respective ones of the cavity pair (24, 22) and which extend axially from the mass. The supports (54, 56) have radial dimensions which are substantially the same as those of the pair of cavities (22, 24). The mass (52) and the supports have axial dimensions which are substantially less than those respectively of the central cavity means and of the pair of cavities (20, 22, 24) for enabling the piston (50) to move axially within the cavities. Air inlets (61, 62) in the housing and conduits (66, 68) in the piston enable the piston to reciprocate within the housing for repeated impact against an impactor (38) for transmission of energy thus obtained to a test table and an item under test.

5 Claims, 2 Drawing Sheets

LOW FREQUENCY VIBRATION ASSEMBLY

BACKGROUND OF THE INVENTION

The present invention relates to a vibrator assembly and, in particular, to a vibrator assembly which is capable of producing such low vibrations as 16 Hertz.

The vibrator assembly as herein disclosed has particular use in the apparatus disclosed in U.S. Pat. Nos. 4,181,025 through 4,181,029 and 4,735,089 which are all assigned to the same assignee of this document. When a pneumatic vibrator, such as described in these patents, is attached to a resonating vibrating table, none of the table resonances below the fundamental frequency of the vibrator are excited. Typical standard vibrators start to operate at about 26 Hertz, including a vibrator having a single cylindrical piston with an elastomeric impactor at one end and an air spring at its other end, and with a single air inlet and four outlets. Such a vibrator has been used and sold over a year prior to the filling of this document in the United States Patent and Trademark Office. The frequency spectra generated by such impacting vibrators are a series of acceleration lines starting at the fundamental frequency and occurring at each harmonic up to the roll off point, for example, 30, 60, 90 ... 2000 Hertz.

It has been found desirable, and sometimes necessary to begin operation at vibrations below 26 Hertz, such as around 16 Hertz for various reasons. Primarily, it is desired to lower the fundamental resonance of a vibration table such as described in the above patents for testing at lower vibrational frequencies. In the area of screening, better test results can be obtained from disturbances at lower frequencies. It has been discovered that some faults in equipment arise only at such low frequencies and are not discernable at higher frequencies. Secondly, by starting at a lower frequency, the harmonics can be more closely spaced. For example, at a harmonic beginning at 16 Hertz, the harmonics would progress at 16, 32, 48 ... 1000 Hertz, which results in more energy at the lower frequencies and more low frequency table resonances being excited. Thus, the resonances on the table and on the equipment under test are more evenly excited.

SUMMARY OF THE INVENTION

These and other considerations are successfully addressed in the present invention by increasing the mass of the piston over conventional pistons, while maintaining a comparable stroke and cushion.

Several advantages are derived from this arrangement. The vibrator has a lower resonant frequency of, for example, 16 to 1000 Hertz with an energy output which is comparable to that of conventional vibrators. Because the present invention enables operation to be started at a lower frequency than previously obtainable, the harmonics are more closely spaced, which results in more energy input to the test table and the item under test. Also, the upper frequency roll-off is lower than that which is obtainable with prior vibrators to enable the vibrator's energy to be concentrated into the low frequency band, e.g., of 16 to 1000 Hertz. By using a heavier piston than before, but with the same impact and size as before, and impacting the piston with an impactor of elastomeric material, a longer period of time can be obtained for the energy to be transmitted from the piston to the test table. This results in spectrum shaping of the roll-off frequencies at levels which are lower than those obtainable with the use of a non-resilient impactor Other aims and advantages, as well as a more complete understanding of the present invention, will appear from the following explanation of exemplary embodiments and the accompanying drawings thereof.

DETAILED DESCRIPTION OF THE PREFERRED EMBODIMENT

Figure 1:
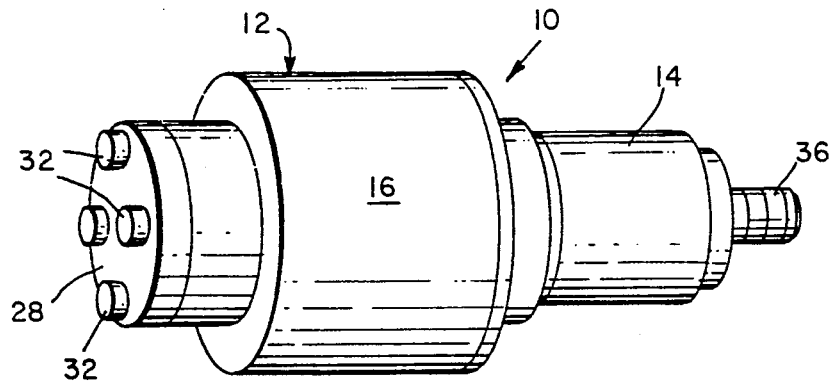
FIG. 1 is a perspective of a preferred embodiment of the present invention.
Figure 2:
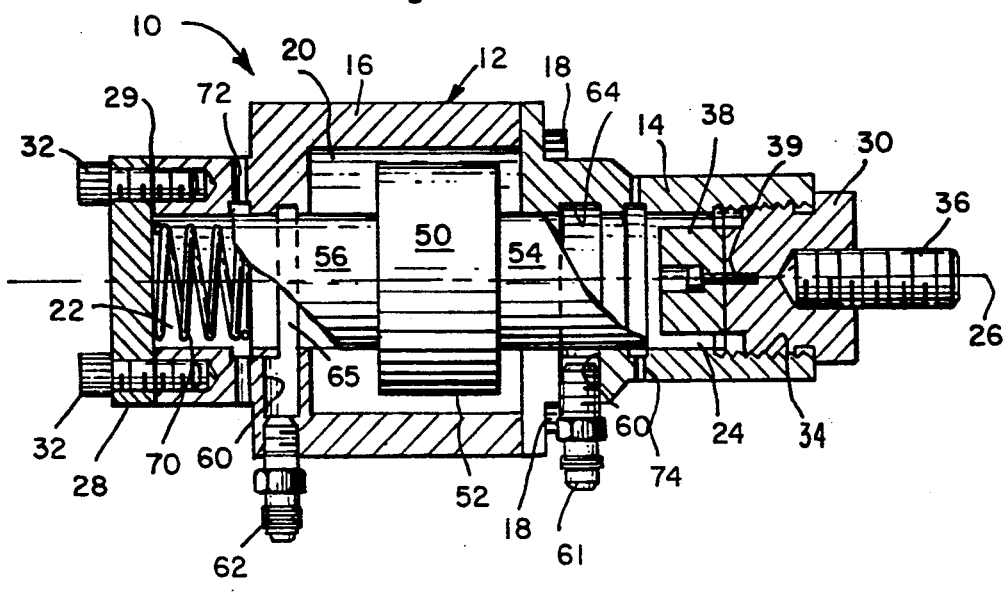
FIG. 2 is a side elevational view, partially in section, of the vibrator assembly depicted in FIG. 1.

Accordingly, as shown in FIGS. 1 and 2, a vibrator assembly 10 comprises a housing 12, which is formed from an upper housing portion 14 and a lower housing portion 16 secured together in any conventional manner, such as by machine screws 18.

Housing 12 includes a central cavity 20 and a pair of cavities or chambers 22 and 24 which are radially smaller in dimension than that of central cavity 20. Cavities 22 and 24 axially extend from central cavity 20 along a housing axis 26. An end plate 28 and gasket 29, and a mounting cap 30 close off the respective opposed ends of housing 12 and are secured thereto, for example, by machine screws 32 and a threaded engagement 34, respectively. A screw or other attachment device 36 is coupled to mounting cap 30 to enable vibrator assembly 10 to be secured to a test table. An impactor 38, such as of "Delrin" or filled Teflon is secured to mounting cap 30 by any convenient attaching means, such as a screw 39.

Figure 3:
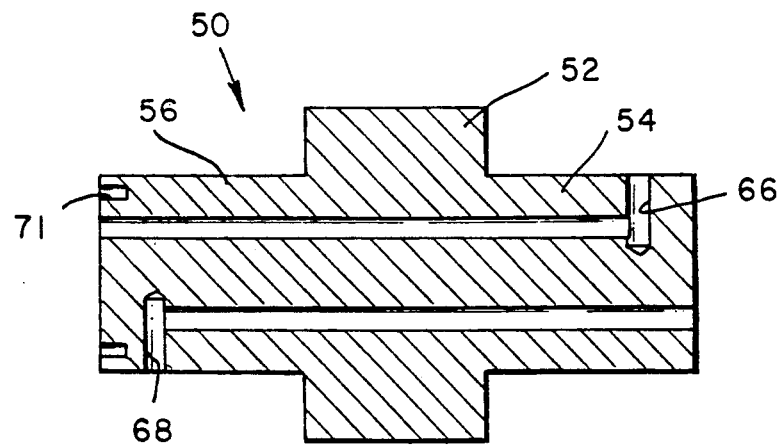
FIG. 3 is a cross-sectional view of the piston illustrated in FIG. 2, showing its internal air conduits.

As shown also in FIG. 3, a piston 50 is housed within housing 12 and includes a mass 52 and a pair of supports 54 and 56 extending axially from opposed sides of mass 52. Supports 54 and 56 have radial dimensions and peripheral configurations which are substantially the same as those respectively of cavities or chambers 22 and 24 to enable proper support of piston 50 in housinq 12. The radial dimension of mass 52 need not be substantially the same radial dimension as that of central cavity 20; it need only be of sufficient mass as to lower the vibrations to a desired low level.

A pair of entry ports 60 are formed in housing 12, into which a pair of fittings- 61 and 62 are threadedly engaged, and terminate in annular recesses 64 and 65, formed also in housing 12. As shown in FIG. 3, L-shaped conduits 66 and 68 extend respectively from the peripheries of supports 54 and 56 and continue through piston 50 to respective chambers or cavities 22 and 24.

A spring 70, having one end recessed in an annular recess 71 of support 56 (see FIG. 3), is disposed between support 56 and end plate 28 to bias piston 50 towards impactor 38. Pair or pairs of exhaust ports 72 and 74 extend respectively from cavities 22 and 24.

Figure 4:
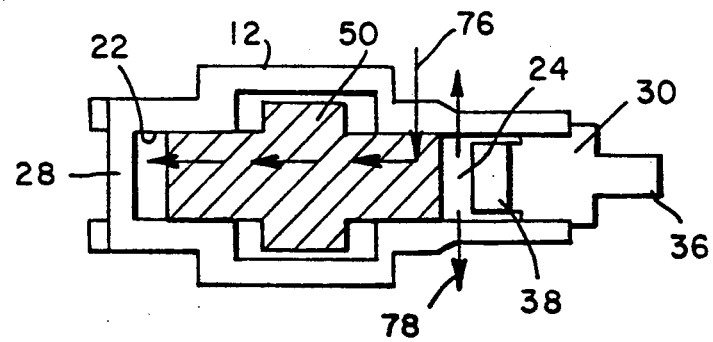
FIGS. 4 and 5 depict air flow in the vibrator assembly with the piston respectively in its rebound position and in its impact position.
Figure 5:
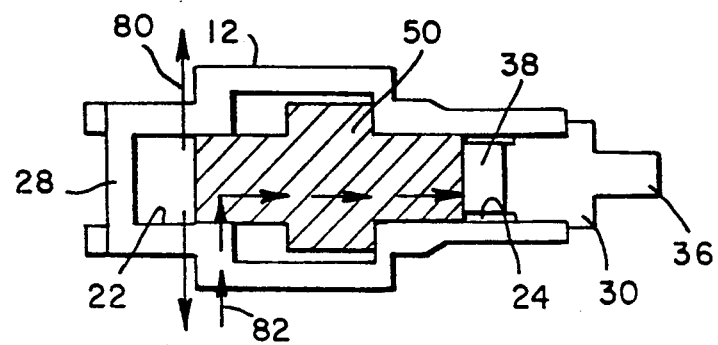

The operation of vibrator assembly 10 is illustrated in FIGS. 4 and 5. A fluid, such as air, is inserted into cavity 22 through its conduit 66 from fitting 61 (as depicted by arrows 76) to move piston 50 axially to the right, as viewed in the drawings. During this movement, exhaust ports 74 communicate with chamber 24 so that air is exhausted, as shown by arrows 78. At the end of its stroke, piston 50 impacts against impactor 38 to transmit the force to the vibration table. Air then is inserted into chamber 24 through its conduit 68 from its air fitting 62 (as illustrated by arrows 82) to move the piston rapidly away from impactor 38. During this movement air exhaust from chamber 22 through ports 72, as shown by arrows 80 Application of air through both fittings 61 and 62 therefore causes a rapid reciprocation of piston 50 within housing 12 and constant impact against impactor 38 to provide low frequency vibrations. Spring 70 is used to offset piston 50 from dead center when air is not supplied through fittings 61 and 62, that is, when vibration assembly 10 is not in use. When assembly 10 is in use and air is supplied through the fittings, piston 50 will move both towards and past dead center by its inertia to the point where the valving created by the piston and entry ports 60 of housing 12 will start the return movement of piston 50, which will thence continue the reciprocation.

Although the invention has been described with respect to a particular embodiment thereof, it should be realized that various changes and modifications may be made therein without departing from the spirit and scope of the invention.

What is claimed is:

1. A vibration assembly comprising:
   a housing having a first and second opposed end centered on an axis defining a central cavity and first and second adjacent cavities of radially smaller dimension than that of said central cavity, said first and second adjacent cavities extending axially from said opposed ends thereof;
   a piston housed within said central cavity including a mass and a pair of supports, one of said supports disposed within each of said first and second adjacent cavities and extending axially from said mass, said supports having radial dimensions which are substantially the same as those of said first and second adjacent cavities, and said mass and said supports having axial dimensions which are substantially less than those respectively of said central cavity and of said first and second adjacent cavities for enabling said piston to move axially within said central cavity;
   a securing means for securing one end of said housing to an object to be vibrated;
   an impactor positioned within one of said first and second adjacent cavities and disposed for contact by one of said supports;
   resilient means positioned within the other cavity of said first and second adjacent cavities between the other of said supports and said housing; and
   means coupled to said piston for reciprocating said piston within said central cavity.

2. A vibration assembly in accordance with claim 1 in which said reciprocating means comprises means respectively for inserting a fluid into said first adjacent cavity while exhausting the fluid from said second adjacent cavity, and for inserting additional fluid into said second adjacent cavity while exhausting the fluid from said first adjacent cavity.

3. A vibration assembly in accordance with claim 2 in which said reciprocating means further comprises a pair of fluid inlets and a pair of fluid outlets respectively adjacent to said first and second adjacent cavities and conduits coupling said first and second adjacent cavities respectively to said pair of fluid inlets.

4. A vibration assembly in accordance with claim 3 in which said conduits comprises annular recesses in said housing and passages extending through said piston from said recesses to said first and second adjacent cavities.

5. A vibration assembly in accordance with claim 4 in which said impactor comprises resistant material and said resilient means comprises a spring.

* * * * *